March 3, 1964  J. F. COOK  3,123,745
CONTROL CIRCUIT FOR LUBRICATING APPARATUS
Filed Aug. 31, 1960
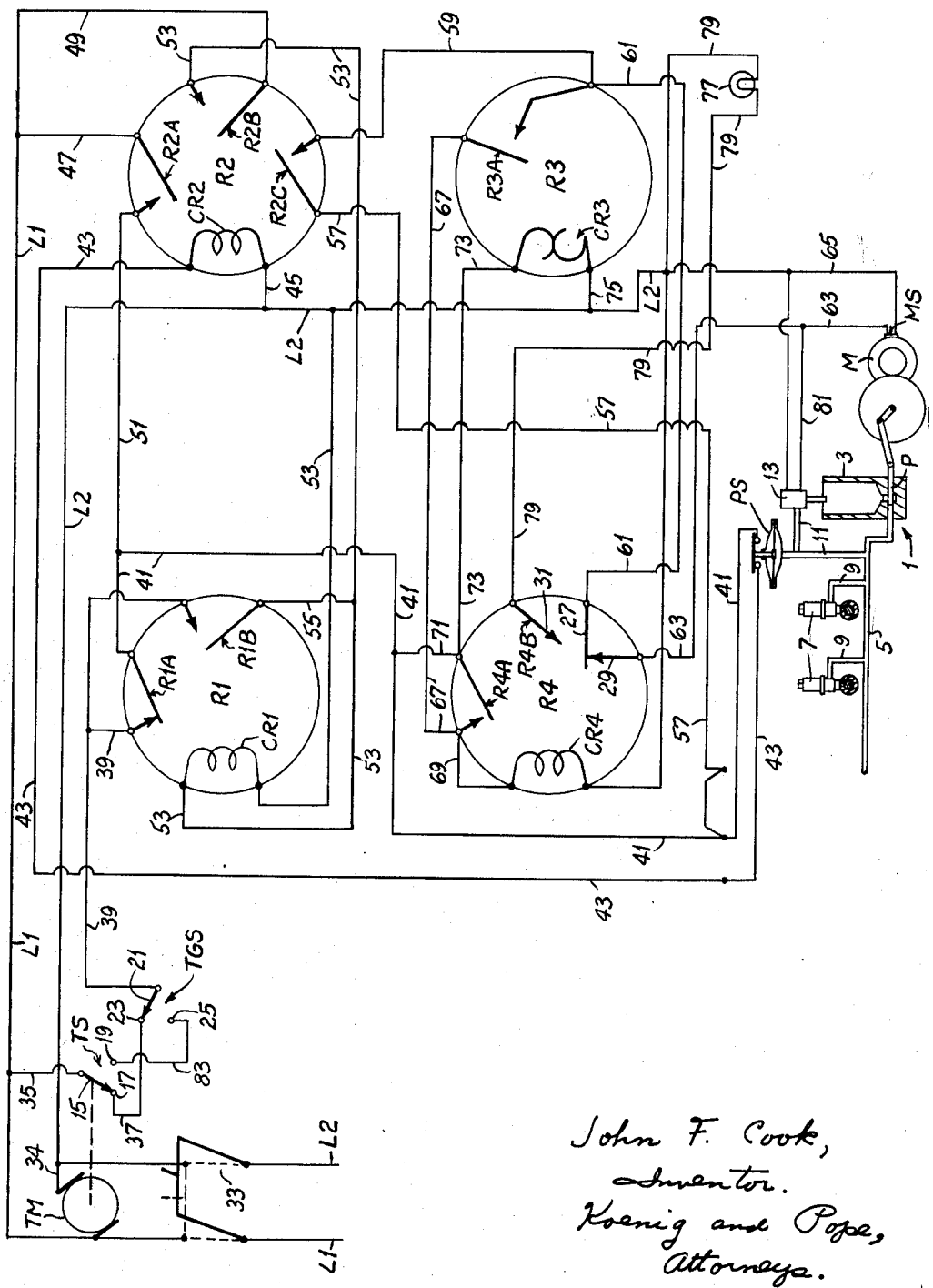
John F. Cook,
Inventor.
Koenig and Pope,
Attorneys.

United States Patent Office 3,123,745
Patented Mar. 3, 1964

3,123,745
CONTROL CIRCUIT FOR LUBRICATING
APPARATUS
John F. Cook, St. Ann, Mo., assignor to The McNeil Machine & Engineering Company, Akron, Ohio, a corporation of Ohio
Filed Aug. 31, 1960, Ser. No. 53,148
16 Claims. (Cl. 317—139)

This invention relates to controls for periodically initiating the operation of an electrically actuated apparatus and stopping it in response to completion of a cycle thereof, and more particularly to a lubricating system of the type having an electrically actuated pumping apparatus for developing lubricant pressure in the system and means for periodically initiating operation of the pumping apparatus, stopping it in response to development of a predetermined lubricant pressure in the system, and then venting the system.

The invention is particularly concerned with a lubricating system of the type having an electrically actuated pumping apparatus for pumping lubricant to one or more lubricant injectors. It is frequently desired that the pumping apparatus of such a system be automatically started at periodic intervals (for example, at one-hour intervals) and automatically stopped when the injectors have cycled, without regard to the time it takes for the pumping apparatus to develop sufficient pressure to cycle the injectors.

Accordingly, among the several objects of the invention may be noted the provision of an improved simplified control for such a system, and which may also be useful for systems other than lubrication systems wherein an electrically actuated apparatus is to be periodically started and stopped in response to completion of a cycle, wherein starting is effected by a timer switch and stopping is effected by a cycle-responsive switch (a pressure-responsive switch in the case of a lubricating system such as above described) without regard as to whether or not the timer switch is open or closed when the cycle-responsive switch opens on completion of a cycle; the provision of a control such as described which effectively prevents the apparatus from restarting even though the timer switch should be closed when the cycle-responsive switch is opened, requiring that the timer switch open and close again before the apparatus starts again; the provision of a control such as described which is effective to keep the apparatus in operation to complete a cycle even though the timer switch opens before the cycle-responsive switch opens; the provision of a control such as described wherein provision may be made for starting the apparatus whenever power is turned on, after which control is asserted by the timer switch; the provision of a control such as described includnig means for stopping the apparatus if it should fail to complete a cycle within a predetermined time; and the provision of a control such as described having means for signalling such failure. Other objects and features will be in part apparent and in part pointed out hereinafter.

The invention accordingly comprises the constructions hereinafter described, the scope of the invention being indicated in the following claims.

In the accompanying drawing, in which one of various possible embodiments of the invention is illustrated, The single figure is a diagrammatic layout showing a lubricating system including a control of this invention.

Referring to the drawing, a lubricating system in which this invention is incorporated is shown to comprise an electrically actuated pumping apparatus 1 for pumping lubricant from a reservoir 3 through an injector supply line 5 to a plurality of lubricant injectors 7, branch lines 9 connecting line 5 to the individual injectors. Each injector is of a type which receives lubricant from the line 5, and which operates in response to development of a predetermined injector-cycling pressure in line 5 to inject a measured charge of lubricant, and which depends for resetting and reloading with another measured charge of lubricant upon relief of pressure in the line 5 subsequent to injection. Injectors of this type are well known and require no further description, their detailed construction not being material to this disclosure. A disclosure of an injector of this type which may be used will be found in U.S. Patent 2,637,413. For venting pressure from line 5, a line 11 including a solenoid vent valve 13 is provided.

As herein illustrated, the electrically actuated pumping apparatus 1 comprises a reciprocating pump P driven by an electric motor M. However, it will be understood that pump P might be driven, for example, by a compressed-air-operated motor with an electrically actuated valve controlling the operation of the motor.

A control of this invention for periodically initiating operation of motor M to drive the pump P and stopping the motor in response to development of injector-cycling pressure in line 5 is shown to comprise a timer switch TS actuated by a timer motor TM, a double-throw toggle switch TGS, first, second, third and fourth relays R1, R2, R3 and R4, and a pressure switch PS responsive to pressure in line 5. The latter is a normally closed switch adapted to open in rseponse to development of injector-cycling pressure in line 5.

The timer switch TS is illustrated as having a blade 15 normally closed on a contact 17 and adapted to open from contact 17 and close on a contact 19. As will be understood, timer motor TM drives means such as a cam (not shown) adapted periodically to cause blade 15 periodically to open off contact 17 and close on contact 19 for a relatively short interval and then reclose on contact 17. Suitable means may be provided for varying the time setting; for example, blade 15 may open off contact 17 for a short interval, once every hour, once every two hours, etc. Toggle switch TGS is a double-throw switch, illustrated as having a blade 21 closed on a contact 23 and adapted to be closed on a contact 25. In an actual physical embodiment of the invention, and maximum time setting is three hours and the minimum time setting is three minutes and forty-five seconds.

Relays R1, R2 and R4 are instantaneously acting relays. Relay R1 has a coil CR1 controlling two sets of contacts or switches R1A and R1B. Switch R1A is normally closed and switch R1B is normally open. Relay R2 has a coil CR2 controlling three normally open sets of contacts or switches R2A, R2B and R2C. Relay R4 has a coil CR4 controlling two sets of contacts or switches R4A and R4B. Switch R4A is a normally open single-throw switch and switch R4B is a double-throw switch having a blade 27 normally closed on a contact 29 and adapted to close on a contact 31 when coil CR4 is energized. Relay R3 is a time delay relay, having an actuating element CR3 (which may be a thermal element) controlling a normally open set of contacts or switch R3A, and acting to close switch R3A upon energization of element CR3 after a predetermined time delay period.

Power lines are indicated at L1 and L2, L1 being the hot line and L2 the neutral line. A main power control switch is indicated at 33. Timer motor TM is connected across lines L1 and L2 as indicated at 34 and is continuously energized when switch 33 is closed. Pole 15—17 of timer switch TS, pole 23—21 of toggle switch TGS, normally closed switch R1A of relay R1, pressure switch PS and coil CR2 of relay R2 are series-connected across lines L1 and L2 in an operating circuit for relay R2 comprising line 35 connecting L1 to blade 15 of switch TS, line 37 connecting contact 17 of switch TS to contact 23 of switch TGS, line 39 connecting blade 21 of switch TGS to one terminal of switch R1A, line 41 connected to one terminal of switch PS, line 43 connecting the other terminal of switch PS to one terminal of coil CR2, and line 45 connecting the other terminal of coil CR2 to line L2. Thus, with main switch 33 closed, blade 15 of timer switch TS on contact 17, blade 21 of toggle switch TGS on contact 23, and pressure switch PS closed, coil CR2 of relay R2 is energized.

Line L1 has a branch connection 47 to one terminal of switch R2A and a branch connection 49 to one terminal of switch R2B. Line 51 connects the other terminal of switch R2A to line 41. Coil CR1 is connected in a line 53 between the other terminal of switch R2B and line L2. Thus, switch R2B and coil CR1 are series-connected across L1 and L2 via lines 49 and 53, so that when switch R2B closes, coil CR1 is energized. Relay R2 is designed so that switch R2A closes before switch R2B. Switch R2A is series-connected with pressure switch PS and coil CR2 via lines 47, 51, 41, 43 and 45 in a holding circuit for coil CR2, whereby the latter is held energized when switch R2A closes. Switch R1B is connected in a holding circuit 55 for coil CR1 shunted around switch R1A between lines 39 and 53, whereby coil CR1 is held energized when R1B closes. This holding circuit is completed when blade 15 of timer switch TS is closed on contact 17 via line 35, blade 15, contact 17, line 37, contact 23, blade 21, line 39, line 55, and line 53 which includes coil CR1, and is broken when blade 15 opens from contact 17. Since switch R2A closes before switch R2B, the holding circuit for coil CR2 is closed before coil CR1 is energized to open switch R1A.

Switches R2A, R2C, pole 29—27 of relay R4 and starter MS for motor M are series-connected across lines L1 and L2 in a power circuit comprising lines 47 and 51, line 41, a line 57 connecting line 41 to one terminal of switch R2C, a line 59 connecting the other terminal of switch R2C to one terminal of switch R3A of relay R3, a line 61 connecting this terminal of R3A to blade 27, a line 63 connecting contact 29 to one terminal of the motor starter and a line 65 connecting the other terminal of the motor starter to line L2. Thus, motor starter MS is energized whenever relay R2 is energized to start the motor M. The other terminal of switch R3A is connected by a line 67 to one terminal of switch R4A. Coil CR4 is connected in line 69 which interconnects this terminal of switch R4A and line L2. The other terminal of switch R4A is interconnected by a line 71 to line 41 and by line 73 to one terminal of element CR3 of relay R3. The other terminal of element CR3 is connected by line 75 to line L2. A signal lamp 77 is connected in a line 79 between contact 31 of switch R4B and line L2.

Solenoid vent valve 13 is connected in parallel with motor starter MS as indicated at 81. Contact 19 of timer switch TS is interconnected with contact 25 of toggle switch TGS as indicated at 83.

Operation is as follows:

As shown in the drawing, the blade of toggle switch TGS is closed on contact 23. When main switch 33 is closed to start timer motor TM, since blade 15 of timer switch TS is normally closed on contact 17, an operating circuit for relay R2 is immediately completed from line L1 via line 35, blade 15 closed on contact 17, line 37, blade 21 closed on contact 23, line 39, normally closed switch R1A of relay R1, line 41, normally closed pressure switch PS, line 43, coil CR2 of relay R2 and line 45 to line L2. Switches R2A, R2B and R2C of relay R2 thereupon close, R2A closing before R2B. When R2A closes, a holding circuit for relay R2 is completed from line L1 via line 47, switch R2A, line 51, line 41, normally closed pressure switch PS, line 43, coil CR2 and line 45 to line L2. When R2B closes, an operating circuit for relay R1 is completed from line L1 via line 49, closed switch R2B, and line 53 including coil CR1 of relay R1 to line L2. Switch R1A thereupon opens and R1B closes. With the latter closed, a holding circuit for relay R1 is completed from line L1 via line 35, blade 15 closed on contact 17, line 37, blade 21 closed on contact 23, line 39, line 55 (including closed switch R1B) and line 53 including coil CR1 to line L2. The holding circuit for relay R2 is completed before switch R1A opens, since R2A closes before R2B. Now both relays R1 and R2 are energized, switch R1A is open, switch R1B is closed, and switches R2A, R2B and R2C are all closed.

With stitches R2A and R2C closed, a power circuit for motor starter MS is completed from line L1 via line 47, closed switch R2A, line 51, line 41, line 57, closed switch R2C, lines 59 and 61, blade 27 and contact 29 of relay R4, line 63, motor starter MS and line 65 to line L2. Valve 13 is energized, since it is connected in circuit 81 in parallel with the motor starter, and it closes to allow pressure to build up in line 5. Motor M thereupon starts and drives the pump P to supply lubricant under pressure to line 5. Ultimately the pressure reaches the value required for operating the injectors 7, and then continues to increase to a somewhat higher value at which pressure switch PS opens. This breaks the holding circuit for relay R2 (which as above described includes pressure switch PS), coil CR2 is deenergized, and switches R2A, R2B and R2C open. This breaks the motor starter circuit, and motor M and pump P stop. Valve 13 is deenergized to vent line 5 and pressure switch PS recloses. The holding circuit for relay R1 remains energized until blade 15 of timer switch TS opens from contact 17. Accordingly, switch R1A remains open. This precludes operation of relay R2 even though the pressure switch PS recloses until blade 15 of timer switch TS opens from contact 17 and then closes back on contact 17. When blade 15 opens from contact 17, the holding circuit for coil CR1 of relay R1 is broken, and switch R1A closes and R1B opens. The timer switch TS then takes over control, and the cycle is thereafter periodically repeated each time the timer switch blade 15 closes back on contact 17 after having been opened.

From the above, it will be apparent that even if the blade 15 of timer switch TS remains closed on contact 17 after the pressure switch PS has opened and reclosed, motor M is prevented from starting until blade opens from contact 17 and recloses on contact 17. Also, even if blade 15 of timer switch TS opens from contact 17 before pressure switch PS opens in response to development of injector-cycling pressure, the power circuit established by relay R2 remains completed to keep motor M in operation to complete a lubrication cycle.

When relay R2 is energized, an operating circuit for time delay relay R3 is established from line L1 via line 47, closed switch R2A, line 51, line 41, line 71, line 73, coil CR3 of relay R3 and line 75 to line L2. Ordinarily, pressure switch PS opens and the lubricating cycle is completed before coil CR3 is energized for a sufficient length of time to close switch R3A of relay R3. However, if for any reason the pump P should fail to develop sufficient pressure in line 5 to open the pressure switch PS within the time limit imposed by the time delay relay R3, switch R3A will close. This completes an operating circuit for relay R4 from line L1 via line 47, closed switch R2A, line 51, line 41, line 57, closed switch R2C, line 59, closed switch R3A, line 67, line 69, coil CR4 of relay R4 and line 69 to line 62. Switch R4A thereupon closes, and blade 27 of switch R4B closes on contact 31. This breaks the power circuit for motor starter MS (which is established through pole 29—27 of switch R4B), and energizes signal lamp circuit 79 to signal a failure of the system. With switch R4A closed, a holding circuit for relay R4 is completed from line L1 via line 47, closed switch R2A, line 51, line 41, line 71, switch R4A, and line 69 including coil CR4 to line L2 to maintain lamp 77 energized.

As above noted, blade 15 of timer switch TS is normally closed on contact 17 and opens from contact 15 only momentarily and then recloses. Accordingly, with blade 21 of toggle switch TGS closed on contact 23, a lubrication cycle is obtained immediately upon initial closure of main switch 33 whenever this may occur, relay R2 then being energized via blade 17 being closed on contact 15 and blade 21 being closed on contact 23. Thereafter, lubrication occurs only on the periodic actuation of the timer switch. This is advantageous in a lubrication system for a machine which is subject to periodic shut-down, since it assures proper lubrication of the machine at the very start of operation of the machine. However, by closing blade 21 on contact 25, relay R2 will be energized only when blade 15 momentarily closes on contact 19 at periodic intervals, so that lubrication occurs solely in response to periodic actuation of the timer switch, and will not occur immediately on closure of main switch 33 (unless blade 15 should happen to be closed on contact 19 at that instant, but this is not apt to occur). Thus, toggle switch TGS acts as a transfer switch for alternately completing the operating circuit for relay R2 through contact 17 or contact 19 of timer switch TS.

While the invention is above described as it pertains to a lubricating system of the type having injectors wherein a cycle is initiated by a timer switch and stopped in response to operation of a pressure switch, it will be understood that the invention may be applicable generally to various systems wherein it is desired to start operation of an electrically actuated apparatus by means of a timer switch, then take the control away from the timer switch and stop the apparatus upon operation of a switch adapted to open in response to completion of a cycle of operation of the apparatus.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A control for periodically initiating operation of an electrically actuated apparatus and stopping it in response to completion of a cycle thereof comprising an initiating switch, timer means for periodically actuating said initiating switch, a normally closed switch adapted to open in response to completion of a cycle of the apparatus and then to close, a first relay having a set of normally closed contacts, a second relay, and interconnections between said relays, said switches and said apparatus providing an operating circuit for the second relay including said initiating switch and said normally closed contacts of said first relay adapted to be energized via said normally closed contacts in response to closure of the initiating switch, a holding circuit for the second relay including said cycle-responsive switch adapted to be energized in response to operation of the second relay and deenergized in response to opening of the cycle-responsive switch, a power circuit for said apparatus adapted to be energized in response to operation of the second relay and deenergized when said second relay is deenergized, an operating circuit for the first relay adapted to be energized in response to operation of the second relay, and a holding circuit for the first relay adapted to be energized in response to closure of the initiating switch and operation of the first relay, whereby said apparatus is started in response to closure of the initiating switch and stopped in response to opening of the cycle-responsive switch, and prevented from starting again despite closing of the cycle-responsive switch until the initiating switch opens to deenergize the first relay and again closes.

2. A control as set forth in claim 1 wherein the second relay includes a set of normally open contacts connected in the holding circuit for the second relay and a normally open set of contacts connected in the operating circuit for the first relay, the former being adapted to close before the latter.

3. A control as set forth in claim 2 wherein the initiating switch is normally closed and periodically opened for a relatively short interval and reclosed.

4. A control as set forth in claim 1 wherein the initiating switch has a first and second contact and is normally closed on the first contact, being periodically opened from the first contact and closed on the second contact for a relatively short interval and then reclosed on the first contact, and wherein there is provided a transfer switch and interconnections between said initiating switch, transfer switch and first relay for alternatively completing the operating circuit for the second relay through the first or second contact of the initiating switch.

5. A control as set forth in claim 1 further comprising time-delay means for breaking said power circuit in response to operation of said apparatus for a predetermined time interval without opening of said cycle-responsive switch.

6. A control as set forth in claim 5 further comprising an electrical signal connected in a circuit adapted to be energized in response to operation of said time-delay means.

7. A control as set forth in claim 5 wherein said time-delay means comprises a third relay and a time-delay relay and interconnections providing an operating circuit for the time-delay relay adapted to be energized in response to operation of the second relay, an operating circuit for the third relay adapted to be energized in response to operation of the time-delay relay, and a holding circuit for the third relay adapted to be energized in response to operation of the third relay, said third relay having a normally closed set of contacts in said power circuit which open on operation of the third relay to break the power circuit.

8. A control as set forth in claim 7 further comprising an electrical signal connected in a circuit adapted to be energized in response to operation of the third relay.

9. In a lubricating system of the type comprising electrically actuated pumping apparatus for developing lubricant pressure in the system, means for periodically initiating operation of the pumping apparatus, stopping it in response to development of a predetermined lubricant pressure in the system, and then venting the system comprising a timer switch, means for periodically actuating said timer switch, a normally closed pressure-responsive switch adapted to open in response to development of said predetermined pressure in the system and to close upon venting of the system, a first relay having a set of normally closed contacts, a second relay, and interconnections between said relays, said switches and said apparatus providing an operating circuit for the second relay including said timer switch and said normally closed contacts of said first relay adapted to be energized via said normally closed contacts in response to closure of the timer switch, a holding circuit for the second relay including said pressure switch adapted to be energized in response to operation of the second relay and deenergized in response to opening of the pressure switch, a power circuit for said apparatus adapted to be energized in response to operation of the second relay and deenergized when said second relay is deenergized, an operating circuit for the first relay adapted to be energized in response to operation of the second relay, and a holding circuit for the first relay adapted to be energized in response to closure of the timer switch and operation of the first relay, whereby said apparatus is started in response to closure of the timer switch and stopped in response to opening of the pressure switch, and prevented from starting again despite closing of the pressure switch until the timer switch opens to deenergize the first relay and again closes.

10. In a lubricating system as set forth in claim 9, said second relay including a set of normally open contacts connected in the holding circuit for the second relay and a normally open set of contacts connected in the operating circuit for the first relay, the former being adapted to close before the latter.

11. In a lubricating system as set forth in claim 10, the timer switch being a normally closed switch which is periodically opened for a relatively short interval and reclosed.

12. In a lubricating system as set forth in claim 1, the timer switch having a first and a second contact and being normally closed on the first contact, periodically opened from the first contact and closed on the second contact for a relatively short interval, and then reclosed on the first contact, a transfer switch and interconnections between said timer switch, transfer switch and first relay for alternatively completing the operating circuit for the second relay through the first or second contact of the timer switch.

13. In a lubricating system as set forth in claim 1, time-delay means for breaking said power circuit in response to operation of said apparatus for a predetermined time interval without opening of said cycle-responsive switch.

14. In a lubricating system as set forth in claim 13, an electrical signal connected in a circuit adapted to be energized in response to operation of said time-delay means.

15. In a lubricating system as set forth in claim 13, said time-delay means comprising a third relay and a time-delay relay and interconnections providing an operating circuit for the time-delay relay adapted to be energized in response to operation of the second relay, an operating circuit for the third relay adapted to be energized in response to operation of the time-delay relay, and a holding circuit for the third relay adapted to be energized in response to operation of the third relay, said third relay having a normally closed set of contacts in said power circuit which open on operation of the third relay to break the power circuit.

16. In a lubricating system as set forth in claim 15, an electrical signal connected in a circuit adapted to be energized in response to operation of the third relay.

References Cited in the file of this patent

UNITED STATES PATENTS

| | | |
|---|---|---|
| 2,521,615 | Walker | Sept. 5, 1950 |
| 2,666,167 | Churchman | Jan. 12, 1954 |
| 2,670,466 | Harper | Feb. 23, 1954 |
| 2,908,848 | Hull | Oct. 13, 1959 |
| 2,962,609 | MacDonald | Nov. 29, 1960 |
| 3,022,641 | Myck et al. | Feb. 27, 1962 |